Patented July 21, 1925.

1,546,562

UNITED STATES PATENT OFFICE.

JOSEPH BRESLAUER AND CHARLES GOUDET, OF GENEVA, SWITZERLAND, ASSIGNORS TO THE FIRM SOCIÉTÉ D'ETUDES CHIMIQUES, POUR L'INDUSTRIE, OF GENEVA, CANTON OF GENEVA, SWITZERLAND.

PROCESS FOR THE MANUFACTURE OF A MIXED NITROGENOUS FERTILIZER.

No Drawing. Application filed December 9, 1921. Serial No. 521,200.

*To all whom it may concern:*

Be it known that we, JOSEPH BRESLAUER and CHARLES GOUDET, citizens of Switzerland, residing at Geneva, in the Confederation of Switzerland, have invented certain new and useful Improvements in Processes for the Manufacture of a Mixed Nitrogenous Fertilizer, of which the following is a specification.

This invention has for its object a process for the manufacture of a mixed nitrogenous fertilizer starting from cyanamides and more particularly from calcium cyanamide.

According to this process, there is added to the cyanamide at least one substance which, whilst neutralizing the free base (lime) always present in crude cyanamides, enables the final product to be obtained in the granulated or crystalline state or in any other form suitable for use in agriculture, without diminishing its value as a fertilizer.

By reason of the absence of the free caustic base, the fertilizer thus prepared can be handled without danger, and will keep indefinitely without attracting the moisture of the air.

There can be added to the cyanamide substances such as the carbonate, the acid sulphate, the sulphite and the acid sulphite, the different phosphates and the nitrate of ammonium.

There can thus be obtained fertilizers which are not caustic and are free from carbides and phosphides, and which possess the same amount of nitrogen as the crude cyanamide, or such fertilizers mixed with one or more substances which are of value as fertilizers.

The following are some examples of carrying the process into practice, viz:—

*Example I.*—The calcium cyanamide is mixed with a concentrated solution of carbonate or bicarbonate of ammonium in quantity just sufficient to neutralize all the free lime, the mixture taking place in a closed receptacle with stirring. The heating is effected for example by means of the gases coming from lime kilns or lime-burning furnaces. The lime present in the calcium cyanamide forms carbonate of lime with the ammonium carbonate; the ammonia which is set free is combined with the carbon dioxide gas ($CO_2$) also coming e. g. from lime-burning furnaces, and the ammonium carbonate formed can serve for a fresh operation.

The product obtained is freed from the excess of water by heating in a vacuum for example and constitutes a nitrogenous fertilizer, which, instead of free lime, contains carbonate of calcium and which is consequently neither caustic nor hygroscopic. The carbonate of calcium, as a source of $CO_2$ is of value as a fertilizer.

Instead of mixing the calcium cyanamide with a solution of carbonate of ammonium, it can be mixed dry with this carbonate and the quantity of water necessary for the reaction can be added to the mixture.

*Example II.*—The crude calcium cyanamide is mixed with sulphite or bisulphite of ammonium in concentrated solution in a closed vessel with stirring. The lime combines with the acid radicle of the sulphurous acid in the form of sulphite of calcium which crystallizes with two molecules of water, in such a manner that it is not necessary to evaporate after the reaction if care has been taken not to employ an excess of water. The ammonia which is set free is recovered by transforming it into carbonate by the carbonic anhydride or into sulphite by the sulphurous anhydride coming for example from pyrites-burners or furnaces.

The fertilizer obtained is formed of a mixture of calcium cyanamide and of sulphite of calcium, the value of which as a fertilizer is known.

*Example III.*—The crude nitrogenated lime (calcium cyanamide) is treated with a solution of ammonium phosphate in a closed vessel with stirring. The free lime, present in the nitrogenated lime, decomposes the phosphate of ammonium forming phosphate of calcium. The ammonia which is set free is introduced into a dilute solution of phosphoric acid. The solution of ammonium phosphate which forms in its condition of a crystallizable salt can be separated from the excess of water either by evaporating or by crystallization. A part of these operations can be effected in the course of the reaction, if the latter takes place hot, by the aid of heat supplied by the gases from lime kilns or lime-burning furnaces. By the above mentioned operation, the troublesome and complicated evaporation of the phosphoric acid is avoided, whilst obtaining a product of recognized value. Crude phosphoric acid can be employed such as results from the preparation of phosphoric acid starting from bone powder or from natural phosphates. The phosphate of ammonium obtained after evaporation of the solution can serve for a fresh operation.

The product obtained is formed of phosphate of calcium and of cyanamide of calcium. The calcium phosphate, being a precipitated tricalcium phosphate is capable of being assimilated by plants.

*Example IV.*—Crude nitrogenated lime (calcium cyanamide) is treated in a closed vessel with a solution of ammonium nitrate. The free lime which occurs in the crude nitrogenated lime decomposes the nitrate of ammonium forming nitrate of calcium and free ammonia which is combined with the carbonic anhydride. The ammonium carbonate formed is decomposed by the calcium nitrate with the formation of calcium carbonate and of ammonium nitrate which is capable of being used in a fresh operation.

The ammonium nitrate can also be regenerated by passing the ammonia set free into dilute nitric acid.

The final product, which constitutes a mixed fertilizer, is composed of a mixture of calcium nitrate and of non-caustic or slightly caustic cyanamide, free from acetylene ($C_2H_2$) and phosphoretted hydrogen, the calcium nitrate being crystallized with the water of crystallization which enables the heat to be economized that would be necessary for desiccation.

A carbonated fertilizer is obtained by mixing the final product with ammonium bicarbonate ($NH_4HCO_3$) or carbonate of ammonium ($(NH_4)_2CO_3$ or again with the commercial carbonate of ammonia composed of bicarbonate and carbamate of ammonia

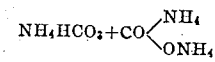

In the last three examples a part of the ammonia can be added in the form of carbonate instead of adding the whole in the form of nitrate, which presents the advantage of having carbonic acid in the fertilizer.

Having now particularly described and ascertained the nature of our said invention, and in what manner the same is to be performed, we declare that what we claim is:

1. A process for converting raw calcium cyanamide into a non-caustic fertilizer by mixing an ammonium salt in sufficient quantity with the raw calcium cyanamide to neutralize the free caustic lime in the raw calcium cyanamide without the loss of nitrogen to obtain a product in which the proportion of nitrogen is substantially the same as in the raw calcium cyanamide employed.

2. A process for converting raw calcium cyanamide into a non-caustic fertilizer consisting in adding an ammonium salt in the presence of water and in a closed vessel to the raw calcium cyanamide to neutralize the free caustic lime in the raw calcium cyanamide without the loss of nitrogen to obtain a product in which the proportion of nitrogen is substantially the same as that in the raw calcium cyanamide employed.

3. A process for converting raw calcium cyanamide into a non-caustic fertilizer consisting in adding ammonium nitrate to the raw calcium cyanamide in the presence of water in a closed vessel and in sufficient quantity to neutralize the free lime present in the raw calcium cyanamide to obtain a product composed of a mixture of calcium nitrate and calcium cyanamide adapted for use as a fertilizer.

In testimony whereof we have affixed our signatures in presence of two witnesses.

JOSEPH BRESLAUER.
CHARLES GOUDET.